(12) United States Patent
Hashimoto

(10) Patent No.: US 6,859,499 B2
(45) Date of Patent: Feb. 22, 2005

(54) DEBLOCKING FILTERING APPARATUS AND METHOD

(75) Inventor: Kohkichi Hashimoto, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 611 days.

(21) Appl. No.: 09/930,510

(22) Filed: Aug. 15, 2001

(65) Prior Publication Data

US 2002/0051496 A1 May 2, 2002

(30) Foreign Application Priority Data

Aug. 16, 2000 (JP) ........................................ 2000-246816

(51) Int. Cl.[7] .............................................. H04N 7/12
(52) U.S. Cl. ................................................ 375/240.27
(58) Field of Search ...................... 375/240.27, 240.28, 375/240.29, 240.24; 348/420.1, 606, 607, 625; 382/232, 234, 238; H04N 7/12

(56) References Cited

U.S. PATENT DOCUMENTS

| | | | | |
|---|---|---|---|---|
| 5,825,419 | A | 10/1998 | Mishima et al. | |
| 6,175,593 | B1 * | 1/2001 | Kim et al. | 375/240.17 |
| 6,240,135 | B1 * | 5/2001 | Kim | 375/240.01 |
| 6,404,361 | B2 * | 6/2002 | Andrews et al. | 341/94 |
| 6,434,197 | B1 * | 8/2002 | Wang et al. | 375/240.29 |
| 6,665,346 | B1 * | 12/2003 | Lee et al. | 375/240.26 |
| 6,678,654 | B2 * | 1/2004 | Zinser et al. | 704/221 |

FOREIGN PATENT DOCUMENTS

| | | |
|---|---|---|
| EP | 0 526 885 A2 | 2/1993 |
| JP | 9-187008 | 7/1997 |
| JP | 10-191335 | 7/1998 |
| JP | 11-004366 | 4/1999 |
| JP | 11-098505 | 4/1999 |
| JP | 11-275584 | 10/1999 |

OTHER PUBLICATIONS

Japan Patent Abstracts, Uchida Tomoaki, "Block Distortion Reduction Circuit", Oct. 29, 1999, 1 page.

Billy Cahill & Conor Heneghan, "Locally Adaptive Deblocking Filter for Low Bit Rate Video", Digital Signal Processing Research Group, Department of Electronic & Electrical Engineering, University College of Dublin, pp. 664–667.

Sung Deuk Kim, Jaeyoun Yi, Hyun Mun Kim and Jong Beom Ra, "A Deblocking Filter with Two Separate Modes in Block–Based Video Coding", IEEE Transactions on Circuits and Systems for Video Technology, vol. 9, No. 1, Feb. 1999, pp. 156–160.

* cited by examiner

Primary Examiner—Nhon Diep
(74) Attorney, Agent, or Firm—Pearne & Gordon LLP

(57) ABSTRACT

A deblocking filtering apparatus has a D mode operation circuit for deblocking filtering defined by MPEG-4,
  a T mode operation circuit,
  an operation mode determination circuit for determining whether the D mode operation circuit or the T mode operation circuit is to be performed, and
  a selector for switching the output of the D mode operation circuit and the output of the T mode operation circuit in accordance with the results of the operation mode determination circuit. Further, before the D mode operation circuit and the T mode operation circuit initiate their operations, the operation mode determination circuit performs an operation and transmits a fixed value, instead of an input pixel value, to a non-adaptive operation circuit. As a result, power consumption is reduced.

5 Claims, 8 Drawing Sheets

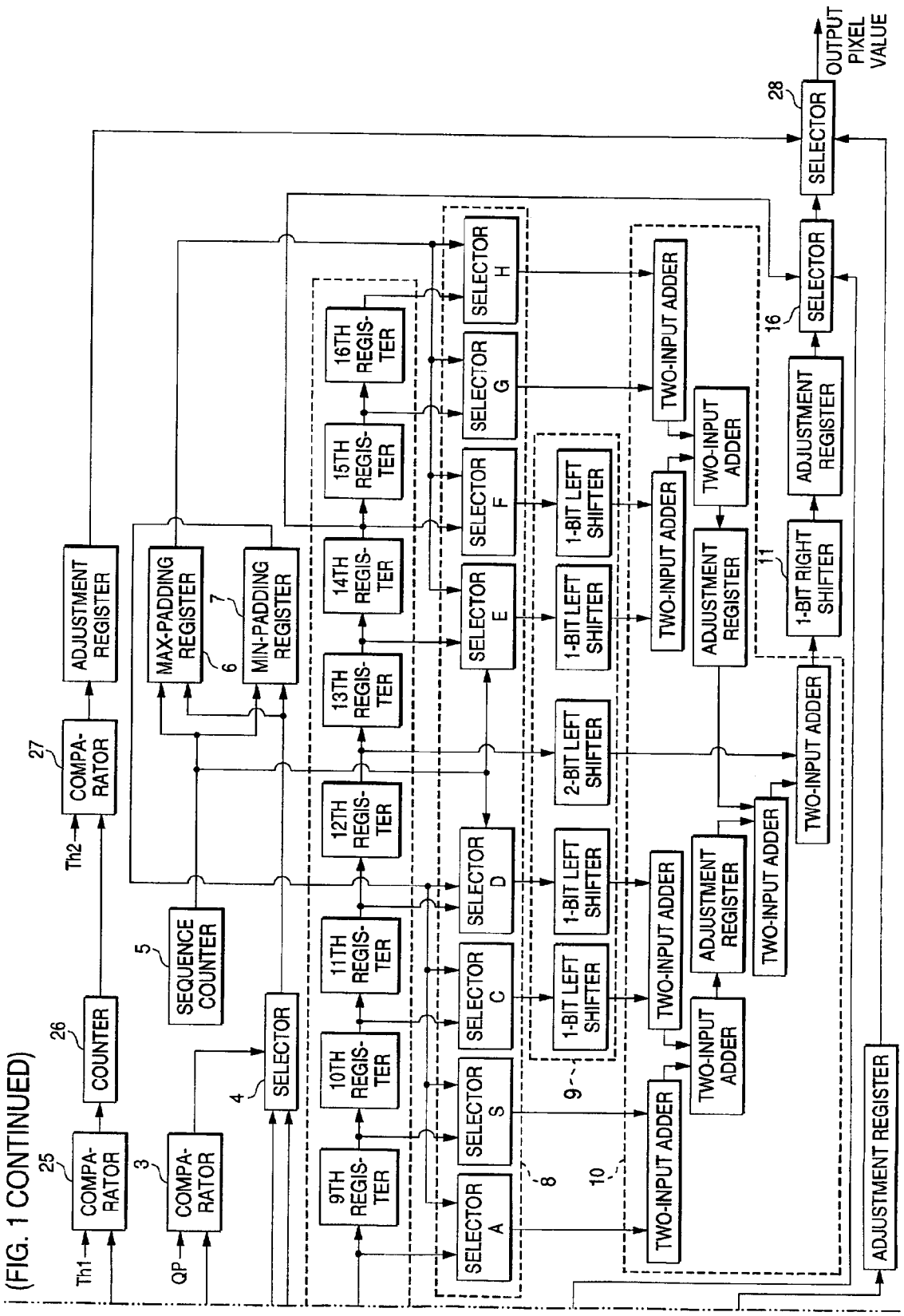

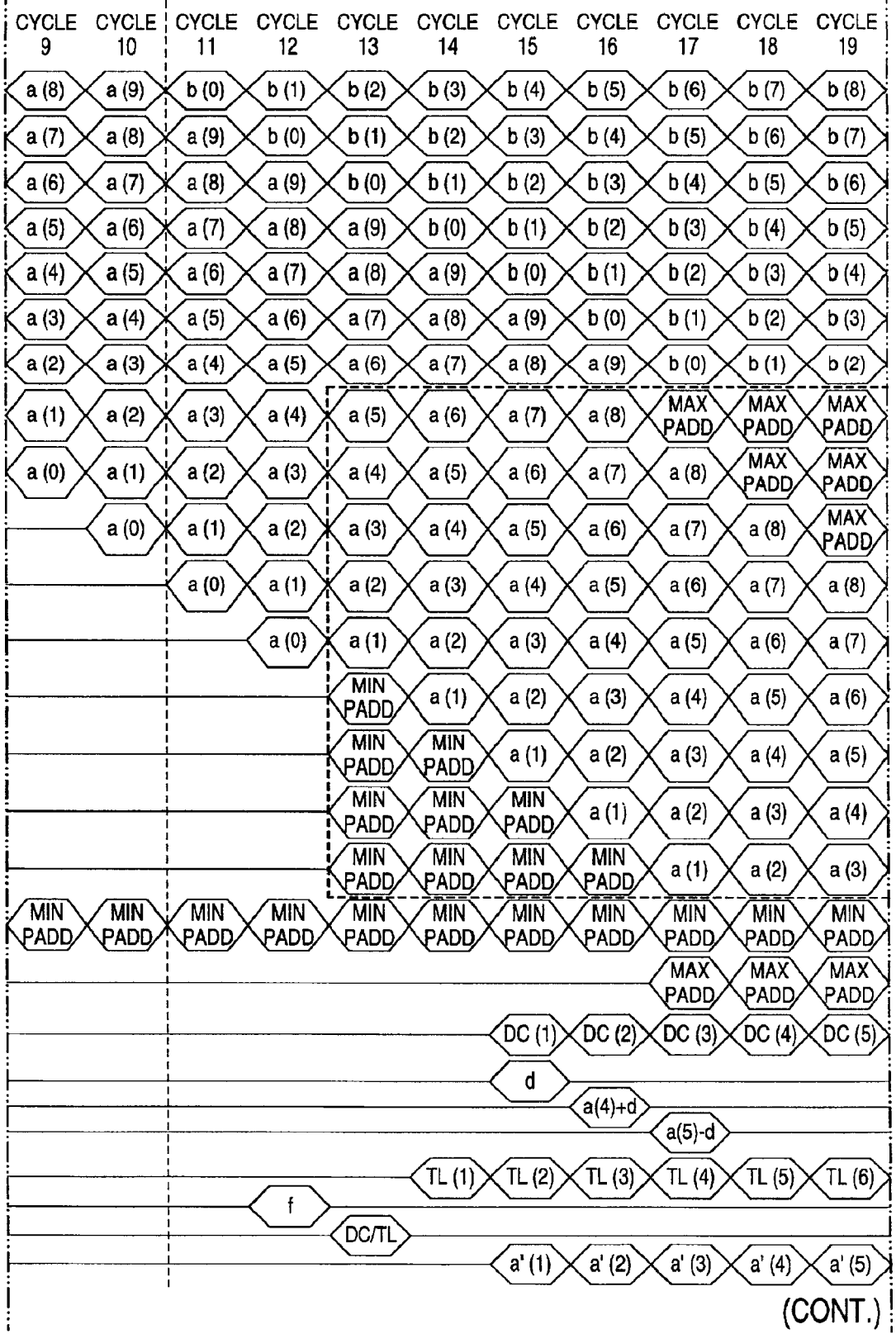

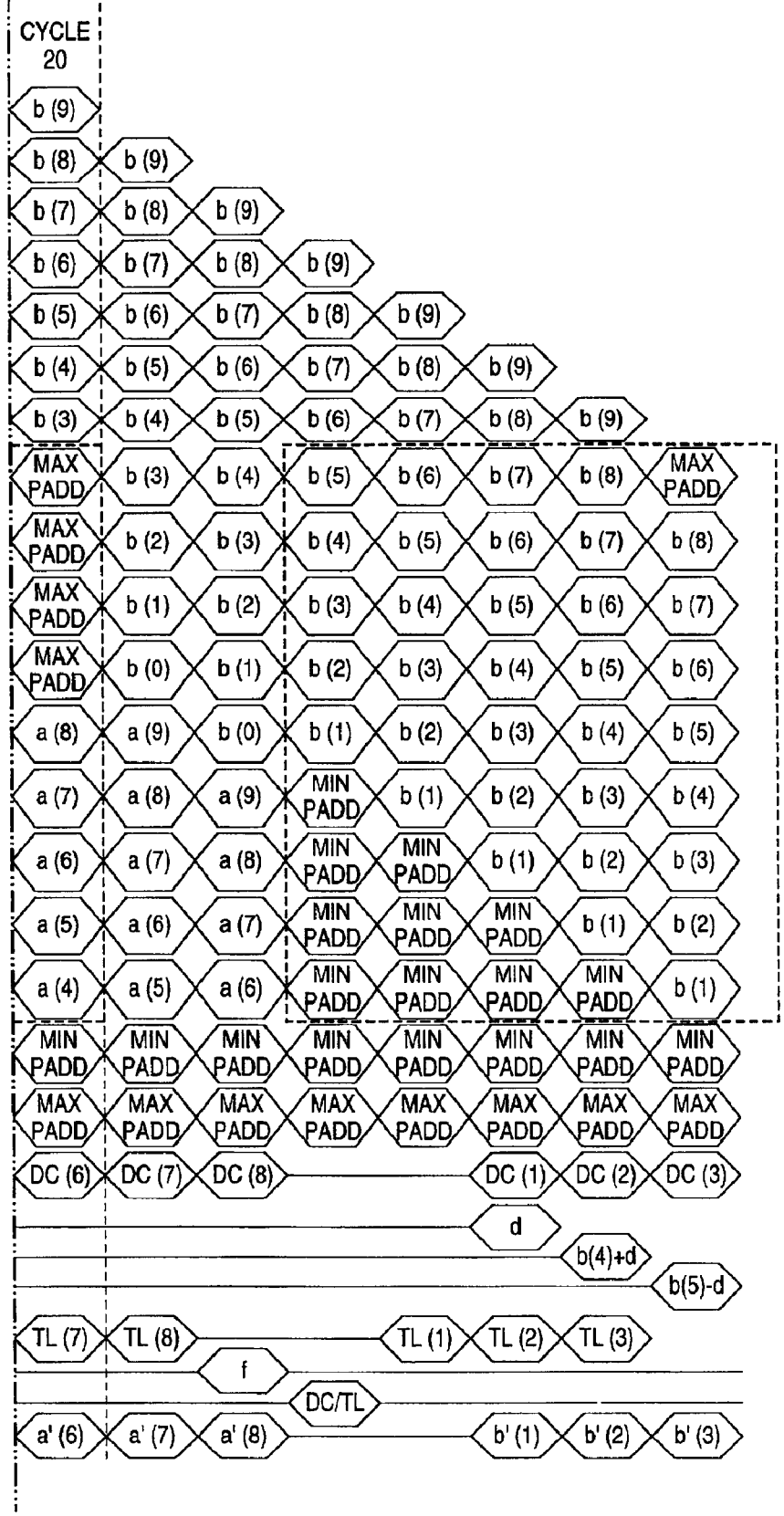
(FIG. 2 CONTINUED)

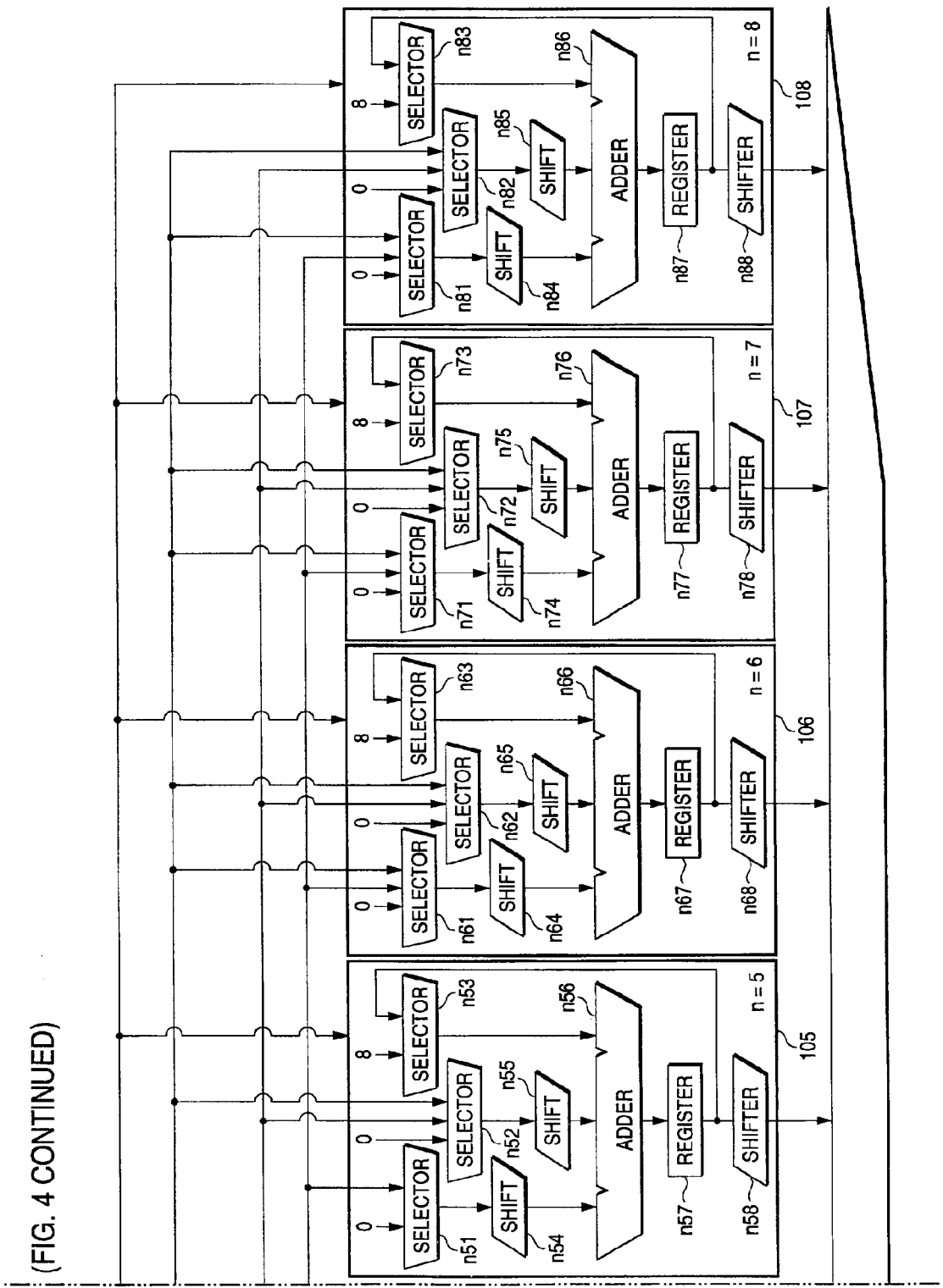
(FIG. 4 CONTINUED)

DEBLOCKING FILTERING APPARATUS AND METHOD

BACKGROUND OF THE INVENTION

The present invention relates to the processing performed for a recovered image during a digital image compression process, and relates in particular to a deblocking filtering apparatus and method defined in MPEG-4.

For the processing of digital images, the internationally accepted MPEG digital image compression standards provide for the employment of a discrete cosine transform. This is an irreversible transform used for quantization, and depending on the condition of an original image, a phenomenon occurs whereby a pseudo outline having a block shape (block noise), which is inherent to the system, may appear in a recovered image.

As a countermeasure, Vertification Model 7.0 of the MPEG-4 video standards defines a deblocking filter as a post process for a recovered image. As is shown in FIG. 3, the defined deblocking filter performs filtering for ten received pixel values positioned around the block boundary, and outputs eight pixel values positioned around the block boundary. Two types of operation modes, a DC offset mode operation (hereinafter referred to as a D mode operation) and a default mode operation, are switched in accordance with a change value (hereinafter referred to as an activity) for the value of a pixel near the block boundary. An evaluation function representing the activity employs the following equation (1).

$$f = \phi\{g(0)-g(1)\} + \phi\{g(1)-g(2)\} + \phi\{g(2)-g(3)\} + \phi\{g93)-g(4)\}$$
$$+ \phi\{g(4)-g(5)\} + \phi\{g(5)-g(6)-g(7)\}$$
$$+ \phi\{g(7)-g(8)\} + \phi\{g(8)-g(9)\}$$

where if $(abs(x) \le Th1)$ $\phi(x)=1$;

else $\phi(x)=0$ (1)

According to an evaluation function f in equation (1), for ten pixel values positioned around a block boundary, an absolute differential value for the difference between adjacent pixel values is compared with a threshold value Th1, and a count is acquired of the locations whereat the absolute differential value is equal to or smaller than the threshold value Th1. If the value of the evaluation function f is equal to or greater than a threshold value Th2, i.e., when the activity is low, the D mode operation is selected. But if the value of the evaluation function f is smaller than the threshold value Th2, i.e., when the activity is high, the default mode operation is selected.

A more effective smoothing process is performed for a D mode operation than is performed for a default mode operation, as is illustrated by an operation equation (2) that is shown below. The smoothing process is performed if the absolute differential value between a maximum pixel value and a minimum pixel value for a string of eight pixels positioned around a block boundary is smaller than twice a quantization parameter QP. If the absolute differential value is equal to or greater than twice the quantization parameter QP, the smoothing process is not performed and an input pixel value is output unchanged.

$$MAX = \max\{g(1), g(2), g(3), g(4), g(5), g(6), g(7), g(8)\};$$

$$MIN = \min\{g(1), g(2), g(3), g(4), g(5), g(6), g(7), g(8)\};$$

if$(abs(MAX-MIN)) < 2*QP)\{min\#padding = abs(g(0)-g(1)) < QP?g(0):g(1);$ $max\#padding = abs(g(8)-g(9)) < QP?g(9):g(8);$ $g'(n)=0;$ for$(i=-4; i<5; i++)$ $g'(n) += coef(i+4)*(n+1<1$ ?min#padding:$n+i>8$?max#padding:$g$ $(n+i)));$ ... (a) $g'(n)=(g'(n)+8)>>4;$ } else $g'(n)=g(n)$ (where coef(9)=$\{1,1,2,2,4,2,2,1,1\}$) (2)

An equation (3) is obtained by specially developing formula (a) in equation (2), and the smoothing process is performed by a weighting function employed mainly for a target pixel and the logical sum of the input pixel string.

$g'(1)=\min+\min+2*\min+2*\min+4*g(1)+2*g(2)+2*g(3)+g(4)+g(5);$ $g'(2)=\min+\min+2*\min+2*g(1)+4*g(2)+2*g(3)+2*g(4)+g(5)+g(6);$ $g'(3)=\min+\min+2*g(1)+2*g(2)+4*g(3)+2*g(4)+2*g(5)+g(6)+g(7);$ $g'(4)=\min+g(1)+2*g(2)+2*g(3)+4*g(4)+2*g(5)+2*g(6)+g(7)+g(8);$ $g'(5)=g(1)+g(2)+2*g(3)+2*g(4)+4*g(5)+2*g(6)+2g(7)+g(8)+\max;$ $g'(6)=g(2)+g(3)+2*g(4)+2*g(5)+4*g(6)+2*g(7)+2*g(8)+\max+\max;$ $g'(7) = g(3) + g(4) + 2*g$ $(5) + 2*g(6) + 4*g$ $(7) + 2*g(8) + 2 + \text{max} + \text{max} + \text{max};$ $g'(8) = g(4) + g(5) + 2*g$ $(6) + 2*g(7) + 4*g$ $(8) + 2 + \text{max} + 2\text{max} + \text{max}+;$ min:min#padding, max:max#padding (3)

An equation (4) is employed for the default mode operation. The smoothing process is performed only for two pixels along a block boundary, and the input values for the other pixels are output unchanged.

$\text{max} = (g(4) - g(5))/2 \, d = \text{nint}(5$ $*(\text{act0}' - \text{act0})/8); \text{ if}((\text{abs}$ $(\text{act0}) < QP) \&\& (\text{sign}(\text{max}) == \text{sign}(d)))$ $d = (\text{abs}(d) > \text{abs}(\text{max}))?\text{max}:d;$ else $d = 0; \, g'(4) = g(4) - d; \, g$ $'(5) = g(5) - d;$ where $QP$ is a quantization parameter of a macro block to which $g(5)$ belongs, $\text{act0} = \text{nint}((2*g(3) - 5*g(4) + 5*g$ $(5) - 2*g(6))/8);$ $\text{act1} = \text{nint}((2*g(1) - 5*g(2) + 5*g$ $(3) - 2*g(4))/8);$ $\text{act2} = \text{nint}((2*g(5) - 5*g(6) + 5*g$ $(7) - 2*g(8))/8);$ $\text{act0}' = \text{sign}(\text{act0}) \cdot \text{min}(\text{abs}(\text{act0}), \text{abs}(\text{act1}), \text{abs}(\text{act2})),$ where no operation is performed for $g$ (1) to $g(3)$ and $g(6)$ to $g(8)$ (4)

Further, instead of the default mode operation, Telenor's adaptive filtering (hereinafter referred to as a T mode operation), which has a smaller calculation amount, may be employed, as is illustrated by a T mode operation (5) that follows. As well as in the default mode operation, the smoothing process is performed for only two pixels along a block boundary, and the input values of all other pixels are output unchanged. For the two pixels along the block boundary, when the evaluation function d in equation (5) is equal to or smaller than a quantization parameter QP/2, a smoothing process is performed in which the value of the evaluation function d is added to or is subtracted from the input pixel value. Then, if the evaluation function value d is greater than the quantization parameter QP/2, the input pixel value is output unchanged.

$d = (g(3) - 3*g(4) + 3*g(5) - g$ $(6) + 4) >> 3; \, g$ $'(4) = \text{abs}(d) > (QP/2)?g(4):g$ $(4) + d; \, g'(5) = \text{abs}(d) > (QP/2)?g$ $(5):g(5) - d,$ where no operation is performed for $g(1)$ to $g$ (3) and $g(6)$ to $g(8)$ (5)

The above deblocking filtering defined by MPEG-4 is first performed along all horizontal edges, and is then performed along all vertical edges.

The above deblocking filter operation is performed, using software, by a general-purpose calculator in a processor, or part of the deblocking filter operation is performed by special hardware and the remainder of the operation is performed, using software, by a general-purpose calculator in a processor.

FIG. 4 is a block diagram showing the special hardware operation for formula (a) in the D mode operation equation (2). In FIG. 4, a counter 100 counts processing cycles from 0 to 7, operation blocks 101 to 108 correspond to filtering target pixels n (n is an integer from 1 to 8), and an output selector 109 selects one of the outputs of the operation blocks 101 to 108.

The operation block 101 includes: first and second selectors n11 and n12, for receiving at least two of the externally input data max_padding, min_padding, input pixel values g(x) and g(x+1), and data 0; a third selector n13, for receiving data "8" and the output of a register n17, which will be described later; first and second shifters n14 and n15, for shifting the output of both the first and the second selectors n11 and n12; an adder n16 for adding the output of the first and the second shifters n14 and n15 to the output of the third selector n13; the register n17, for holding the output of the adder n16; and a third shifter n18, for shifting the output of the register n17.

The operation blocks 102 to 108 have the same configuration as the operation block 101, and include, respectively, first selectors n21, n31, n41, n51, n61, n71 and n81; seconds electors n22, n32, n42, n52, n62, n72 and n82; third selectors n23, n33, n43, n53, n63, n73 and n83; first shifters n24, n34, n44, n54, n64, n74 and n84; second shifters n25, n35, n45, n55, n65, n75 and n85; adders n26, n36, n46, n56, n66, n76 and n86; registers n27, n37, n47, n57, n67, n77 and n87; and third shifters n28, n38, n48, n58, n68, n78 and n88.

Since software is used for conventional deblocking filtering, a large number of operating cycles is required and the processing is slow. Further, when as in the conventional art special hardware is used for a part of an operation in order to increase the processing speed, both a processor and special hardware are required, and this increases manufacturing costs.

SUMMARY OF THE INVENTION

It is, therefore, one objective of the present invention to implement a hardware configuration that requires only a small number of cycles to perform the overall deblocking filtering, so that a deblocking filtering apparatus having a small circuit structure can be provided without a software process and a processor being required.

According to a first aspect of the invention, a deblocking filtering apparatus comprises:

a D mode operation circuit for performing a D mode operation for a deblocking filter defined in MPEG-4;

a T mode operation circuit for performing a T mode operation;

an operation mode determination circuit for employing a change in a pixel value near a block boundary to adaptively determine whether the D mode operation or the T mode operation should be performed; and a selector for selecting, in accordance with the output of the operation mode determination circuit, either the output of the D mode operation circuit or the output of the T mode operation circuit, wherein the D mode operation circuit, the T mode operation circuit and the operation mode determination circuit are operated in parallel in synchronization with the input timings of pixel values that are sequentially input.

According to a second aspect, in the deblocking filtering apparatus of the first aspect, the operation mode determination circuit performs a process before, in a time series, the processes for the D mode operation circuit and the T mode operation circuit; selects either the D mode operation circuit or the T mode operation circuit as an adaptive operation circuit; and transmits a fixed value, instead of an input pixel value, to a non-adaptive operation circuit.

According to a third aspect of the invention, in the deblocking filtering apparatus of the first aspect, the D mode operation circuit includes:

a shift register group for shifting an input pixel value;

a first absolute differential value operation circuit for obtaining an absolute differential value for a difference between adjacent registers of the shift register group;

a first comparator for comparing the output of the first absolute differential operation circuit with a first threshold value;

a first selector for selecting a specific register output by the shift register group in accordance with the output of the first comparator;

a sequence counter for counting the number of cycles following the initiation of the operation;

first and second registers for holding the output of the first selector for a specific cycle indicated by the sequence counter;

a selector group for changing between the specific register output of the shift register group and output of the first and the second register in accordance with a cycle indicated by the sequence counter;

a first shifter group for shifting the output of the selector group to the left;

a first adder group for adding together the output of the selector group and the output of the first shifter group;

a first shifter for shifting the output of the first adder group to the right;

third and fourth registers for holding the maximum value and the minimum value for the specific register output of the shift register group during a specific cycle indicated by the sequence counter;

a second absolute differential value operation circuit for obtaining an absolute differential value for a difference between the third and the fourth registers;

a second comparator for comparing the output of the second absolute differential value operation circuit with a second threshold value;

a second selector for changing the specific register output of the shift register group and the output of the first shifter in accordance with the output of the second comparator. And the T mode operation circuit includes:

a second shifter group for shifting to the left the specific register output of the shift register group;

a second adder group for adding the specific register output of the shift register group and the output of the second shifter group;

a second shifter for shifting the output of the second adder group to the right;

an adder for adding the output of the second shifter to the specific register output of the shift register group;

a subtracter for subtracting the output of the second shifter from the specific register output of the shift register group;

a third comparator for comparing the absolute value for the output of the second shifter with a third threshold value; and a third selector for switching the specific register output of the shift register group, the output of the adder and the output of the subtracter in accordance with the output of the third comparator. The operation mode determination circuit includes:

a third absolute differential value operation circuit for obtaining an absolute differential value for a difference between adjacent registers in the shift register group;

a fourth comparator for comparing the output of the third absolute differential value operation circuit with a fourth threshold value;

a counter for cumulatively adding the output of the fourth comparator; and a fifth comparator for comparing the output of the counter with a fifth threshold value. The deblocking filtering apparatus further comprises: a fourth selector for switching the output of the D mode operation circuit and the output of the T mode operation circuit in accordance with the output of the operation mode determination circuit.

According to a fourth aspect of the invention, a deblocking filtering method comprises:

a D mode operation step of performing a D mode operation for a deblocking filter defined in MPEG-4;

a T mode operation step of performing a T mode operation;

an operation mode determination step of employing a change in a pixel value near a block boundary to adaptively determine whether the D mode operation or the T mode operation should be performed; and a step of selecting either the output at the D mode operation step or the output at the T mode operation step in accordance with the output at the operation mode determination step, wherein the D mode operation, the T mode operation and the operation mode determination are performed in parallel in synchronization with the input timings for pixel values that are sequentially input.

According to a fifth aspect, in the deblocking filtering method of the fourth aspect, the operation mode determination is performed before, in a time series, the D mode operation and the T mode operation are initiated, either the D mode operation or the T mode operation is determined as an adaptive operation, and a fixed value, rather than an input pixel value, is input as a non-adaptive operation.

According to the first and fourth aspect, the D mode operation circuit, the T mode operation circuit and the operation mode determination circuit, all of which process sequentially input pixel values, are operated in parallel and in synchronization with the input timing for the pixel value. Thus, all the operations can be completed within the number of process cycles for the operation circuit having the maximum process cycles. Therefore, the software process that uses the general-purpose calculator of the computer is not required, and the deblocking filtering can be performed quickly and requires only a small number of process cycles.

According to the second and fifth aspect, the operation mode determination is performed before the D mode operation and T mode operation. Therefore, an adaptive operation can be determined in advance, and the input pixel value for a non-adaptive operation can be defined as a fixed value. Thus, both the number of calculations required and the power consumption can be reduced.

DETAILED DESCRIPTION OF THE PREFERRED EMBODIMENT

Figure 1:
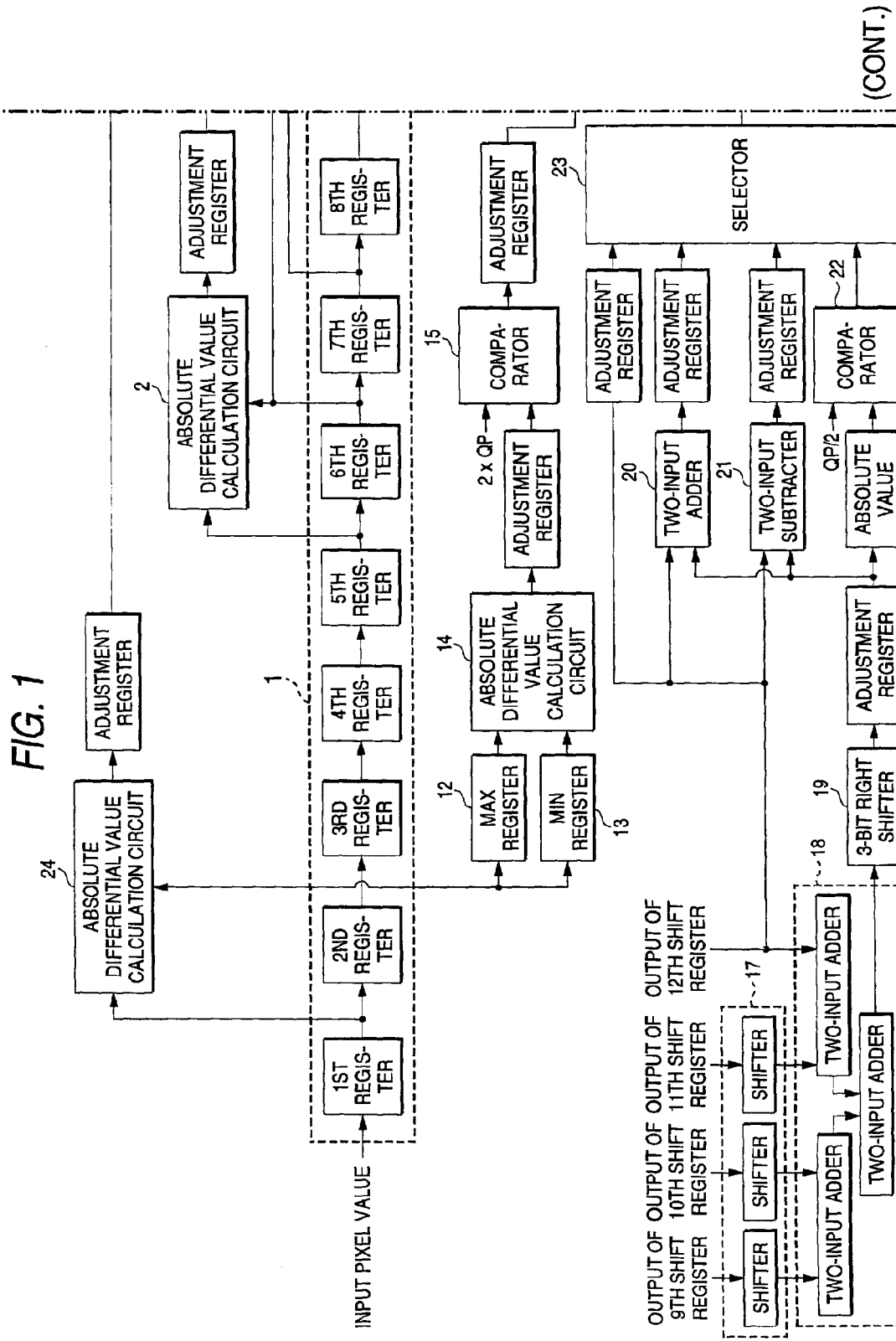
FIG. 1 is a block diagram showing a deblocking filtering apparatus according to one embodiment of the invention.

The preferred embodiment of the invention will now be described while referring to the accompanying drawings. FIG. 1 is a block diagram showing a deblocking filtering apparatus according to this embodiment.

In FIG. 1, the deblocking filtering apparatus comprises: a shift register group 1; a first absolute differential value calculation circuit 2, for calculating the absolute differential value for a difference between specific adjacent registers in the shift register group 1; a first comparator 3, for comparing the output of the first absolute differential calculation circuit 2 with a quantization parameter QP (first threshold value); a first selector 4, for employing the output of the first comparator 3 to select one of the register values to be input to the first absolute differential calculation circuit 2; a sequence counter 5; and first and second register values 6 and 7, for holding the output of the first selector 4 during a specific sequence cycle indicated by the count value of the sequence counter_5.

Further, the deblocking filtering apparatus comprises: a selector group 8, for switching the output of the shift register group 1 and the output of the first and of the second registers in accordance with the output of the sequence counter 5; a first shifter group 9, for shifting the output of the selector group 8 one bit or two bits to the left; a first, two-input adder group 10, for adding the output of the selector group 8 to the output of the first shifter group 9; and a first shifter 11, for shifting the output of the two-input adder group 10 four bits to the right.

The deblocking filtering apparatus also comprises: a third register 12, for holding the maximum value for a specific register output by the shift register group 1; a fourth register 13, for holding the minimum value for a specific register output by the shift register group 1; a second absolute differential value calculation circuit 14, for obtaining the absolute differential value for a difference between the third register output and the fourth register output; a second comparator 15, for comparing the output of the second absolute differential value calculation circuit 14 with a value (second threshold value) that is twice that of the quantization parameter QP; and a second selector 16, for switching the output of the specific register in the shift register group 1 and the output of the first shifter 11 in accordance with the results of the second comparator 15. The components 1 to 16 constitute an operation block for the D mode operation.

In FIG. 1, the deblocking filtering apparatus additionally comprises: a second shifter group 17; a second two-input adder group 18, for adding the output of a specific register in the shift register group 1 to the output of the second shifter group 17; a second shifter 19, for shifting the output of the second two-input adder group 18 three bits to the right; a two-input adder 20, for adding the output of the second shifter 19 to the output of the specific register in the shift register group 1; a two-input subtracter 21, for subtracting the output of the second shifter 19 from the output of the specific register in the shift register group 1; a third comparator 22, for comparing the output of the second shifter 19 with a quantization parameter QP/2 (third threshold value); and a third selector 23, for switching the output of a specific register in the shift register group 1, the output of the two-input adder 20 and the output of the two-input subtracter 21 in accordance with the output of the third comparator 22. The components 17 to 23 constitute an operation block for the T mode operation.

Furthermore, the deblocking filtering apparatus in FIG. 1 comprises: a third absolute differential value calculation circuit 24, for calculating the absolute differential value for a difference between specific adjacent registers in the shift register group 1; a fourth comparator 25, for comparing the output of the third absolute differential calculation circuit 24 with a threshold value Th1 (fourth threshold value); a counter 26, for cumulatively adding the output of the fourth comparator 25; a fifth comparator 27, for comparing the output of the counter 26 with a threshold value Th2 (fifth threshold value); and a fourth selector 28, for switching the output of the second selector 16 with the output of the third selector 23 in accordance with the output of the fifth comparator 27. Together, the components 24 to 28 form an operation mode determination circuit block for determining whether a D mode operation or a T mode operation should be selected. In FIG. 1, a timing adjustment register is provided as needed in the circuit in order to adjust the number of operation cycles that differ in the processing paths.

Figure 2:
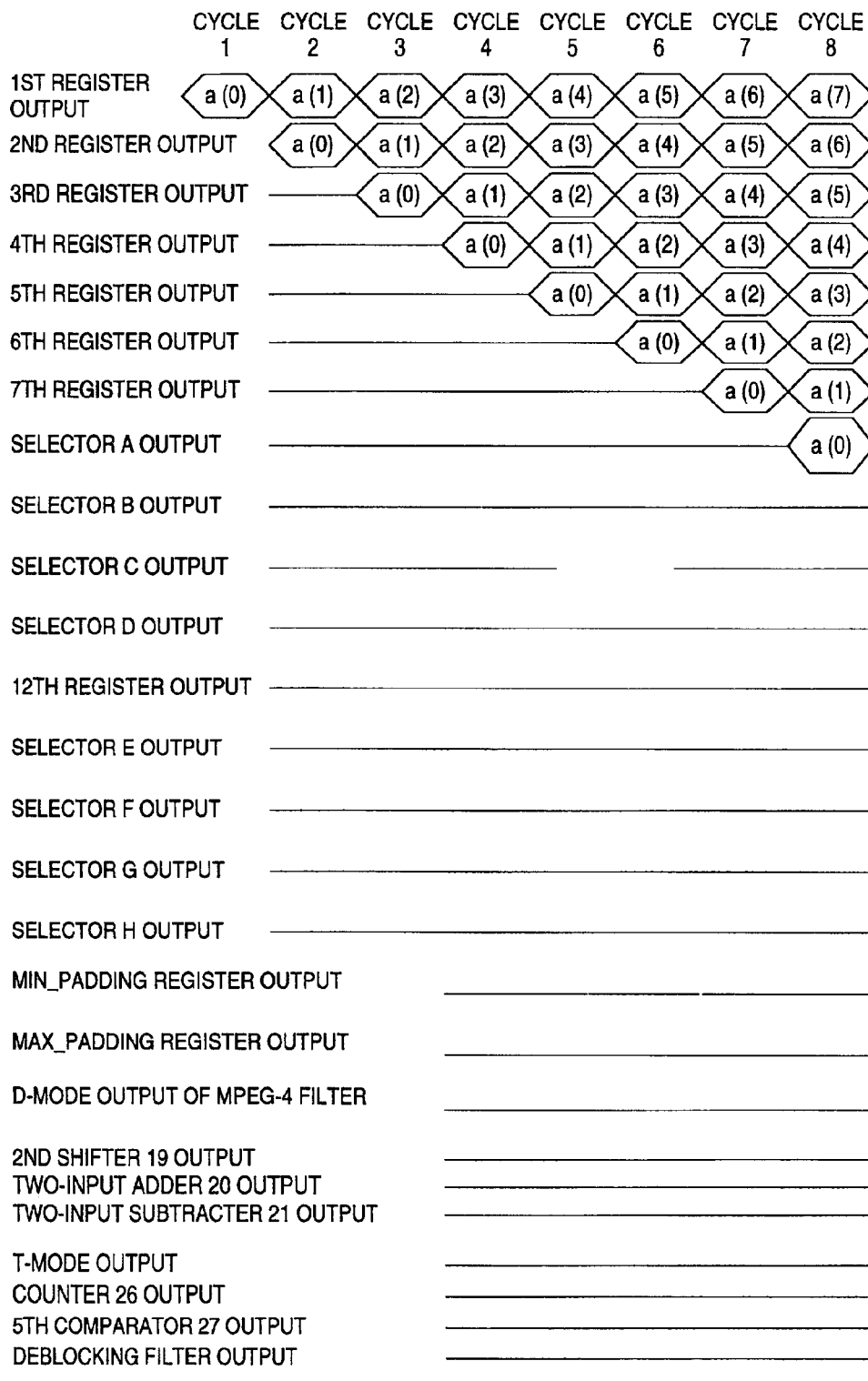
FIG. 2 is a timing chart for the deblocking filtering apparatus according to the embodiment of the invention.
Figure 3:
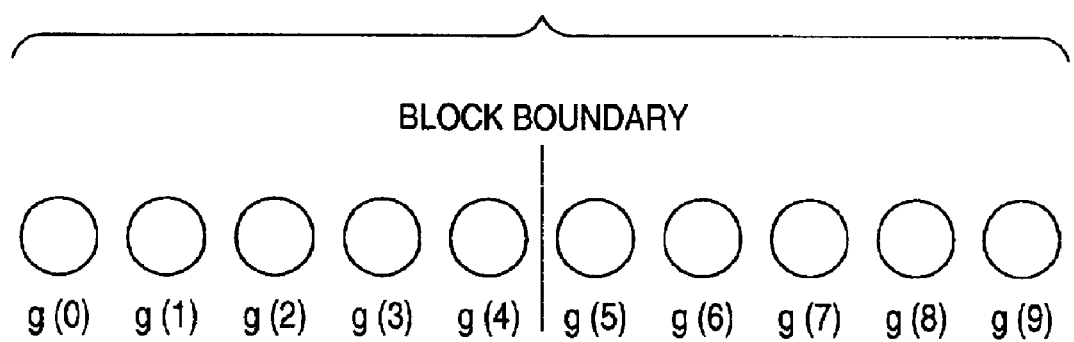
FIG. 3 is a diagram showing the locations of pixels that are input to a deblocking filter defined by MPEG-4.
Figure 4:
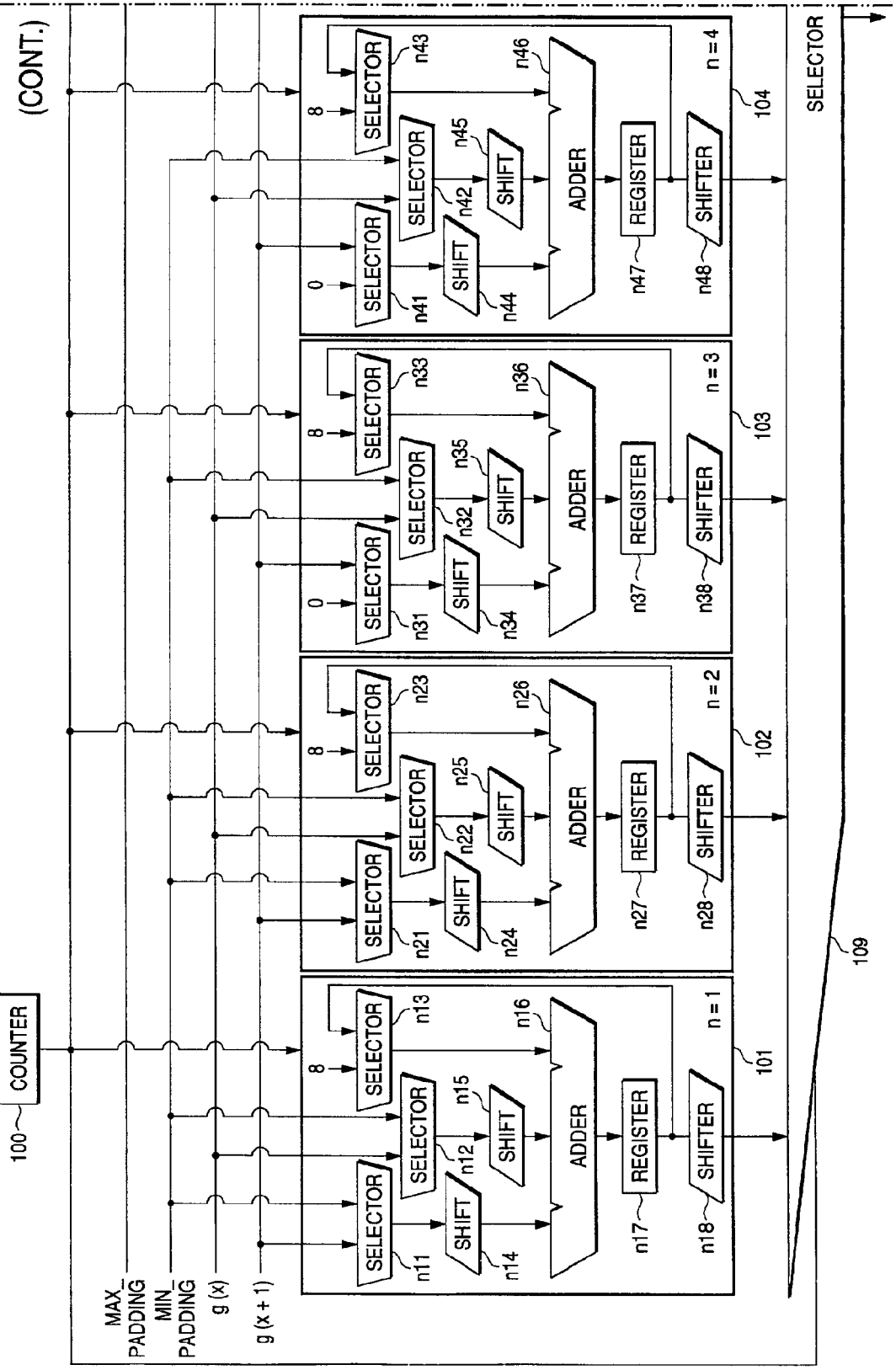
FIG. 4 is a block diagram showing a conventional operation apparatus for performing a D mode operation.

The operation of the thus arranged deblocking filtering apparatus in this embodiment will now be explained while referring to FIG. 2. The processing for a vertical block boundary will be explained; however, the same process is performed for a horizontal block boundary by changing the order in which the pixel values are input.

Ten pixel values positioned along the block boundary, a(0), a(1), a(2), a(3), a(4), a(5), a(6), a(7), a(8) and a(9), are arranged in order, beginning with a(0) on the left; and ten pixel values positioned along the block boundary of the next line, b(0), b(1), b(2), b(3), b(4), b(5), b(6), b(7), b(8) and b(9), are arranged in order, beginning with b(0) on the left. Pixel value data is transmitted to the shift register group 1 each cycle in the order a(0), a(1) and a(2), and when the cycle for transmitting a(0) is defined as cycle 0, at cycle 1, a(0) serves as the output of the first register of the shift register group 1, and at cycle 2, a(0) serves as the output of the second register.

At cycle 7, whereat the sixth register output by the shift register group 1 is a(1) and the seventh register output is a(0), the first absolute differential value calculation circuit 2 calculates the absolute differential value for the difference between a(0) and a(1). At the next cycle, the first comparator 3 compares the absolute differential value with the quantization parameter QP. Then, if as the result of a comparison it is found that the absolute differential value is smaller than the quantization parameter QP, the first selector 4 selects a(0), which is the output of the eighth register in the shift register group 1. However, if the absolute differential value is found to be equal to or greater than the quantization parameter QP, the first selector 4 selects a(1), which is the output of the seventh register in the shift register group 1. The first register 6 holds the output of the first selector 4. The value held by the first register 6 is min_padding value in equation (2).

Similarly, at cycle 15, whereat the sixth register output by the shift register group 1 is a(9) and the seventh register output is a(8), the first absolute differential value calculation circuit 2 calculates the absolute value for the difference between a(8) and a(9). At the next cycle, the first comparator 3 compares the obtained absolute differential value with the quantization parameter QP. Then, if as the result of a comparison it is found that the absolute differential value is smaller than the quantization parameter QP, the first selector 4 selects a(9), which is the output of the seventh register in the shift register group 1. However, if the output of the absolute differential value is found to be equal to or greater than the quantization parameter QP, the eighth register output, a(8), is selected. The second register 7 holds the output of the first selector 4. The value held by the second register 7 is the max_padding value in equation (2).

After cycle 13, a smoothing process is performed by using the 8-th to the 16-th register outputs of the shift register 1, and the min_padding value and the max_padding value. Each selector in the selector group 8 is operated in the following manner during a period extending from cycle 13 to cycle 20. The selector A outputs the value of the eighth register in the shift register group 1 during a period extending from cycle 13 to cycle 16, and outputs the max_padding value during a period extending from cycle 17 to cycle 20. The selector B outputs the value of the ninth register in the shift register group 1 during a period extending from cycle 13 to cycle 17, and outputs the max_padding value during a period extending from cycle 18 to cycle 20. The selector C outputs the value of the tenth register in the shift register group 1 during a period extending from cycle 13 to cycle 18, and outputs the max_padding value during a period extending from cycle 19 to cycle 20. The selector D outputs the value of the eleventh register in the shift register group 1 during a period extending from cycle 13 to cycle 19, and outputs the max_padding value at cycle 20.

The selector E outputs the min_padding value at cycle 13, and outputs the value of the thirteenth register during a period extending from cycle 14 to cycle 20. The selector F outputs the min_padding value during a period extending from cycle 13 to cycle 14, and outputs the value of the fourteenth register during a period extending from cycle 15 to cycle 20. The selector G outputs the min_padding value during a period extending from cycle 13 to cycle 15, and outputs the value of the fifteenth register during a period extending from cycle 16 to cycle 20. The selector H outputs them in_padding value during a period extending from cycle 13 to cycle 16, and outputs the value of the sixteenth register during a period extending from cycle 17 to cycle 20.

Then, the first shifter group 9 shifts the output of each of the selectors C to F in the selector group 8 one bit to the left, and shifts the output of the twelfth register of the shift register group 1 two bits to the left. Further, the first two-input adder group 10 sums the output of the selectors A, B, G and H of the selector group 8 and the output of the shifters of the first shifter group 9, and to this adds a constant "8". Finally, the second shifter 11 shifts the results four bits to the right, and obtains the pixel value at the completion of the smoothing process.

The following operation is performed to determine whether, as the output of the D mode operation, the pixel value obtained at the completion of the smoothing process should be output, or whether the input pixel value should be output unchanged.

The output each cycle of the second shift register in the shift register group 1 is compared during a period extending from cycle 3 to cycle 10, and the maximum value of the input pixel values a(1) to a(8) is held in the third register 12 and the minimum value of the input pixel values a(1) to a(8) is held in the fourth register 13. At cycle 12, the second absolute differential value calculation circuit 14 calculates the absolute differential value for the difference between the values held in the third register 12 and the fourth register 13. Then, at cycle 13, the second comparator 15 compares the absolute differential value with twice the quantization parameter QP. If, as a result of the comparison, it is determined that the output of the second absolute differential value calculation circuit 14 is smaller than twice of the quantization parameter QP, the second selector 16 selects the pixel value obtained at the completion of the smoothing process, which is the output of the first shifter 11. Whereas if the output of the second absolute differential value calculation circuit 14 is equal to or greater than the quantization parameter QP, the second selector 16 selects the input pixel value that is the output of fourteenth register in the shift register group 1.

The output of the D mode operation is obtained through the above processing.

Now, the operation of the T mode calculation circuit will be described. At cycle 15, the second shifter group 17 shifts the output of the tenth and of the eleventh shift registers in the shift register group 1 one bit to the left. The second two-input adder group 18 and the second shifter 19 calculate value "d" in equation (5) by using the output of the second shifter group 17 and the output of the ninth and of the twelfth shift registers of the shift register group 1. At cycle 16, the two-input adder 20 adds a(4), which is the output of the twelfth shift register in the shift register group 1, to the value d in equation (5), which is the output of the second shifter 19. At cycle 17, the two-input subtracter 21 subtracts the value d in equation (5), which is the output of the second shifter 19, from a(5), which is the output of the twelfth shift register in the shift register group 1. As a result, the pixel value at the completion of the smoothing process is obtained.

The following operation is performed to determine whether, as the output of the T mode operation, the pixel value obtained at the completion of the smoothing process should be output, or whether the input pixel value should be output unchanged.

The third comparator 22 compares the quantization parameter QP/2 with the absolute value of the value d in equation (5), which is the output of the second shifter 19. If the absolute value of the value d in equation (5) is equal to or smaller than the quantization parameter QP/2, the third selector 23 selects the pixel value at the completion of the smoothing process, which is the output of the two-input adder 20 or the two-input subtracter 21. Whereas if the absolute value of the value d in equation (5) is greater than the quantization parameter QP/2, the third selector 23 selects the input pixel value, which is the output of the twelfth register in the shift register group 1.

The output of the T mode operation is obtained through the above processing.

An explanation will now be given for the operation of the operation mode determination circuit for determining whether the D mode operation or the T mode operation should be performed.

The third absolute differential value calculation circuit 24 obtains the absolute value for the difference in the output of the first register and the second register in the shift register group 1. Therefore, at cycle 2, whereat the output of the first register in the shift register group 1 is a(1) and the output of the second register is a(0), the absolute value (a(0)–a(1)) is obtained. And at cycle 3, whereat the output of the first register of the shift register group 1 is a(2) and the output of the second register is a(1), the absolute value (a(1)–a(2)) is obtained. Hereinafter, in the same manner, for each cycle an absolute differential value is calculated for the difference between adjacent input pixel values.

The fourth comparator 25 compares the output of the third absolute differential value calculation circuit 24 with the threshold value Th1. If the output of the third absolute differential value calculation circuit 24 is equal to or smaller than the threshold value Th1, a value of 1 is output. But if the output of the third absolute differential value calculation circuit 24 is greater than the threshold value Thl, a value of 0 is output. During a period extending from cycle 2 to cycle 10, the counter 26 cumulatively adds the output of the fourth comparator 25 and obtains the value f in equation (1). The fifth comparator 27 then compares the output of the counter 26 with the threshold value Th2, and if the output of the counter 26 is equal to or greater than the threshold value Th2, the fourth selector 28 selects the output of the second selector 16. However, if the output of the counter 26 is smaller than the threshold value Th2, the fourth selector 28 selects and outputs the output of the third selector 23.

Therefore, if the pixel value for a pattern wherein there is a moderate change between adjacent pixel values and block noise appears frequently is input to the filter, the D mode operation is selected and a more effective smoothing process is performed. Whereas if the pixel value for a pattern wherein there is a drastic change between adjacent pixel values and block noise appears seldom is input to the filter, the T mode operation is selected, and the amount of calculations performed during the smoothing process is reduced.

As is described above, in this embodiment, a deblocking filtering apparatus can be provided for which hardware is employed to completely implement the D mode operation and the T mode operation of a deblocking filter defined by MPEG-4 and an adaptive filter determination operation. The software process is not required, and the operations are performed in parallel, in synchronization with the timings whereat the pixel values are sequentially input. As a result, a fast filtering operation can be performed.

According to the second aspect, the operation mode determination circuit of the deblocking filter operation apparatus in the first aspect performs a process before, in a time series, the processes for D mode operation circuit and the T mode operation circuit, selects either the D mode operation circuit or the T mode operation circuit as an adaptive operation circuit. When the deblocking filer operation apparatus determines the T mode operation is adaptive, the max_padding value and min_padding value are employed as the output of the selector group 8, so that signal changes in the first shifter group 9 and in the first two-input adder group 10 are limited. Thus, the power consumption required by the deblocking filtering apparatus of the first aspect can be even more reduced.

As is described above, according to the invention, the employment is implemented of hardware that can efficiently operate in parallel the D mode operation circuit for the deblocking filter defined by MPEG-4, the T mode operation circuit and the circuit for selecting either circuit as an adaptive circuit. Therefore, the software process that uses the general-purpose calculator of the processor is not required, and a fast filtering process can be performed.

What is claimed is:

1. A deblocking filtering apparatus comprising:
   a D mode operation circuit for performing a D mode operation for a deblocking filter defined in MPEG-4;
   a T mode operation circuit for performing a T mode operation;
   an operation mode determination circuit for employing a change in a pixel value near a block boundary to adaptively determine whether the D mode operation or the T mode operation should be performed; and
   a selector for selecting either the output of the D mode operation circuit or the output of the T mode operation circuit, in accordance with the output of the operation mode determination circuit,
   wherein the D mode operation circuit, the T mode operation circuit and the operation mode determination circuit are operated in parallel in synchronization with the input timings of pixel values that are sequentially input.

2. A deblocking filtering apparatus according to claim 1, wherein the operation mode determination circuit performs a process before, in a time series, the processes for the D mode operation circuit and the T mode operation circuit, selects either the D mode operation circuit or the T mode operation circuit as an adaptive operation circuit, and transmits a fixed value, instead of an input pixel value, to a non-adaptive operation circuit.

3. A deblocking filtering apparatus according to claim 1, wherein the D mode operation circuit includes:
   a shift register group for shifting an input pixel value;
   a first absolute differential value operation circuit for obtaining an absolute differential value for a difference between adjacent registers of the shift register group;
   a first comparator for comparing the output of the first absolute differential value operation circuit with a first threshold value;
   a first selector for selecting a specific register output by the shift register group in accordance with the output of the first comparator;
   a sequence counter for counting the number of cycles following the initiation of the operation;
   first and second registers, for holding the output of the first selector for a specific cycle indicated by the sequence counter;
   a selector group for changing between the specific register output of the shift register group and output of the first and the second register in accordance with a cycle indicated by the sequence counter;
   a first shifter group for shifting the output of the selector group to the left;
   a first adder group for adding the output of the selector group and the output of the first shifter group;
   a first shifter for shifting the output of the first adder group to the right;
   third and fourth registers for holding the maximum value and the minimum value for the specific register output of the shift register group during a specific cycle indicated by the sequence counter;

a second absolute differential value operation circuit for obtaining an absolute differential value for a difference between the third and the fourth registers;

a second comparator for comparing the output of the second absolute differential value operation circuit with a second threshold value; and a second selector, for changing the specific register output of the shift register group and the output of the first shifter in accordance with the output of the second comparator, wherein the T mode operation circuit includes:

a second shifter group for shifting to the left the specific register output of the shift register group;

a second adder group for adding the specific register output of the shift register group and the output of the second shifter group;

a second shifter for shifting the output of the second adder group to the right;

an adder for adding the output of the second shifter to the specific register output of the shift register group;

a subtracter for subtracting the output of the second shifter from the specific register output of the shift register group;

a third comparator for comparing the absolute value for the output of the second shifter with a third threshold value; and a third selector for switching the specific register output of the shift register group, the output of the adder and the output of the subtracter in accordance with the output of the third comparator, wherein the operation mode determination circuit includes:

a third absolute differential value operation circuit for obtaining an absolute differential value for a difference between adjacent registers in the shift register group;

a fourth comparator for comparing the output of the third absolute differential value operation circuit with a fourth threshold value;

a counter for cumulatively adding the output of the fourth comparator; and a fifth comparator, for comparing the output of the counter with a fifth threshold value, wherein the selector switches the output of the D mode operation circuit and the output of the T mode operation circuit in accordance with the output of the operation mode determination circuit.

4. A deblocking filtering method comprising:

a D mode operation step of performing a D mode operation for a deblocking filter defined in MPEG-4;

a T mode operation step of performing a T mode operation;

an operation mode determination step of employing a change in a pixel value near a block boundary to adaptively determine whether the D mode operation or the T mode operation should be performed; and a step of selecting either the output at the D mode operation step or the output at the T mode operation step in accordance with the output at the operation mode determination step, wherein the D mode operation, the T mode operation and the operation mode determination are performed in parallel in synchronization with the input timings for pixel values that are sequentially input.

5. A deblocking filtering method according to claim 4, wherein the operation mode determination is performed before, in a time series, the D mode operation and the T mode operation are initiated, either the D mode operation or the T mode operation is determined as an adaptive operation, and a fixed value, rather than an input pixel value, is input as a non-adaptive operation.

* * * * *

UNITED STATES PATENT AND TRADEMARK OFFICE
CERTIFICATE OF CORRECTION

PATENT NO. : 6,859,499 B2
DATED : February 22, 2005
INVENTOR(S) : Hashimoto

It is certified that error appears in the above-identified patent and that said Letters Patent is hereby corrected as shown below:

Column 1,
Line 39, please delete "(3)}+ϕ{g93)-g(4)}" and insert therefor -- (3)}+ϕ{g(3)-g(4)} --
Line 43, please delete "(5)-g(6)-g(7)}" and insert therefor -- (5)-g(6)}+ϕ{g(6)-g(7)} --.

Signed and Sealed this

Twenty-fourth Day of May, 2005

JON W. DUDAS
*Director of the United States Patent and Trademark Office*